United States Patent
Birnie et al.

(10) Patent No.: US 12,287,692 B2
(45) Date of Patent: Apr. 29, 2025

(54) METHOD FOR REDUCING POWER USAGE AT A REMOTE TERMINAL

(71) Applicant: NCR Corporation, Atlanta, GA (US)

(72) Inventors: Steven James Birnie, Scotland (GB);
Ian McFarlane Denny, Scotland (GB);
Peter Roy Vettraino, Scotland (GB)

(73) Assignee: Cardtronics USA, Inc., Atlanta, GA (US)

( * ) Notice: Subject to any disclaimer, the term of this patent is extended or adjusted under 35 U.S.C. 154(b) by 27 days.

(21) Appl. No.: 18/216,704

(22) Filed: Jun. 30, 2023

(65) Prior Publication Data
US 2025/0004534 A1  Jan. 2, 2025

(51) Int. Cl.
*G06F 1/32* (2019.01)
*G06F 1/3287* (2019.01)

(52) U.S. Cl.
CPC .................. *G06F 1/3287* (2013.01)

(58) Field of Classification Search
CPC ...................................................... G06F 1/3287
See application file for complete search history.

(56) References Cited

U.S. PATENT DOCUMENTS

| | | | | |
|---|---|---|---|---|
| 8,830,028 B2 * | 9/2014 | Kang | .................. | G07F 19/20 340/5.52 |
| 9,519,328 B2 * | 12/2016 | Woodruff | .............. | G06F 1/3287 |
| 11,704,687 B1 * | 7/2023 | De Frank | .............. | G07F 19/209 705/14.37 |
| 2007/0249316 A1 * | 10/2007 | Rao | ..................... | H04W 84/005 455/343.1 |
| 2015/0076222 A1 * | 3/2015 | Ma | ....................... | G06F 1/3293 235/379 |

FOREIGN PATENT DOCUMENTS

WO  2018118332 A1  6/2018

OTHER PUBLICATIONS

Extended European Search Report for corresponding European Patent application No. 23219063.7, dated May 30, 2024.

* cited by examiner

*Primary Examiner* — Zahid Choudhury
(74) *Attorney, Agent, or Firm* — Notaro, Michalos & Zaccaria P.C.; John S Economou

(57) ABSTRACT

A method, computing device, computing system and computer program which receive, by at least one first computing device of a plurality of computing devices, and from a master computing device in communication with each of the plurality of computing devices, at least one command for changing a state of at least one user interface device of the first computing device; and responsive to receiving the command, change a state of at least one said user interface device from a first state with a first power usage to a second state with a second power usage that is less than the first power usage, thereby reducing the power usage of the first computing device.

13 Claims, 3 Drawing Sheets

METHOD FOR REDUCING POWER USAGE AT A REMOTE TERMINAL

FIELD OF THE INVENTION

The present invention relates to dynamically reducing power consumption on computing devices such as Automated Teller Machines or Self-Service Terminals or the like. In particular, but not exclusively, the present invention relates to a methodology whereby multiple slave ATMs provide data regarding their status and capability to a master computing device and the master computing device then determines which ATMs to send commands to for causing a change in state on the ATMs that then reduces power consumption of the ATMs.

BACKGROUND

Automated Teller Machines (ATMs), Self-Service Terminals (SSTs), Point of Sale (POS) Terminals kiosks and the like are known. For example, an automated teller machine (ATM) is an electronic banking outlet that allows customers/users to complete basic transactions without the aid of a bank representative or teller. Anyone with a credit card or debit card can access transaction services at most ATMs. ATMs provide both basic cash-dispensing services as well as advanced functions, including: check depositing, account information access, fund transfers, marketing of relevant products and the like. Historically, ATMs have not included any functionality to enable a user to communicate with a remote bank teller. However, newer types of ATM do have additional functionality that enables a user to communicate with a bank teller. These new types of ATMs are sometimes referred to as Interactive Teller Machines (ITMs). ITMs offer the basic components of an ATM, such as the receipt printer and card reader; however, ITMs usually include additional features such as: a video camera and handset for conducting conversations with a teller, a coin dispenser for distributing different denominations of coins, an ID scanner for authenticating the customer, a signature pad and the like.

In the financial, commerce and hospitality sectors there is awareness of the need to measure and improve environmental impact. One way of doing this is by reducing the environmental impact of physical estates such as bank branches, stores, restaurants or the like. This may be achieved by measuring and reducing the power consumed on site, therefore reducing the amount of $CO_2$ produced. However, in terms of terminals such as ATMs (particularly through-the-wall ATMs), SSTs or POS terminals, there is a challenge in that these terminals can be powered 24/7 and across an estate these do consume high amounts of energy. This energy consumption can be directly attributed to a cost and $CO_2$ impact.

Currently the energy output from terminals cannot be controlled or managed. The terminal/machine does not know the difference between peak times and low times, where is busy in a branch or store, or have the ability to direct consumers to a different machine if it is 'sleeping', low on cash or malfunctioning.

SUMMARY

It is an aim of the present invention to at least partly mitigate one or more of the above-mentioned problems.

It is an aim of certain embodiments of the present invention to help reduce power consumption of certain computing devices such as ATMs, thereby reducing $CO_2$ emissions.

It is an aim of certain embodiments of the present invention to help efficiently manage power usage of computing devices such as ATMs in a particular establishment or estate (e.g., a bank branch, a shopping mall or the like), particularly when it is determined that not all of the computing devices need to be active at certain points in time.

It is an aim of certain embodiments of the present invention to help enable a master computing device to continuously control the state of multiple slave computing devices such as ATMs simultaneously and in real time.

It is an aim of certain embodiments of the present invention to help switch a state of an ATM or one or more ATM devices between normal and standby, or from on to off, to help reduce power consumption.

It is an aim of certain embodiments of the preset invention to help provide a methodology of taking customer usable services (statement, receipt, cash dispense, etc.) or entire products in or out of service to reduce power consumption.

It is an aim of certain embodiments of the present invention to utilize machine learning to determine an optimum combination of ATMs or the like to take out of service at any particular point in time.

According to a first aspect of the present invention there is provided a computer-implemented method for reducing power usage of at least one computing device, comprising the steps of: receiving, by at least one first computing device of a plurality of computing devices, and from a master computing device in communication with each of the plurality of computing devices, at least one command for changing a state of at least one user interface device of the first computing device; and responsive to receiving the command, changing a state of at least one said user interface device from a first state with a first power usage to a second state with a second power usage that is less than the first power usage, thereby reducing the power usage of the first computing device.

Aptly, changing a state of the user interface device comprises de-activating the user interface device.

Aptly, de-activating the user interface device comprises switching off a respective power supply that supplies power to a respective user interface device.

Aptly, de-activating the user interface device comprises switching the user interface device from a normal state into a standby state, whereby the standby state uses less power than the normal state.

Aptly, de-activating the user interface device comprises switching off a main power supply of the first computing device, thereby de-activating all user interface devices of the first computing device.

Aptly, the method further comprises: receiving, at a self-powered network interface device integrated into the main power supply of the first computing device, said command.

Aptly, de-activating the user interface device further comprises switching the first computing device from a normal state into a standby state, whereby the standby state uses less power than the normal state, thereby de-activating all user interface devices of the first computing device.

Aptly, the method further comprises: switching the first computing device into a standby state comprises only providing power to at least one main processor core of the first computing device.

Aptly, the method further comprises: sending, from each of the plurality of computing devices, data indicative of a status and capability of each respective computing device, to the master computing device; determining, by the master computing device, at least one selected user interface device of at least one selected computing device to change a state of; and responsive to said determining, sending at least one command to each selected computing device for changing the state of each selected user interface device.

Aptly, the method further comprises: determining the selected user interface device to change a state of based on a geographical location of each computing device of the plurality of computing devices relative to a geographical location of other computing devices of the plurality of computing devices and/or based on a day of the week and/or based on a time of day and/or based on a capability of each computing device of the plurality of computing devices relative to a capability of other computing devices of the plurality of computing devices.

Aptly, determining comprises: inputting the data indicative of the status and capability of each respective computing device into at least one machine learning module, pre-trained using data associated with the first computing device and/or usage of the first computing device, over a predetermined time period, and/or one or more events affecting usage of the first computing device; and outputting, from the machine learning module, data indicating at least one selected user interface device of at least one selected computing device to change a state of.

Aptly, the method further comprises: responsive to changing the state of the user interface device, displaying a message on a display of the first computing device indicating a location of at least one other computing device of the plurality of computing devices that remain in a normal state.

Aptly, the method further comprises: determining, via a timer device integrated into a main power supply of the first computing device, that a predetermined time has elapsed; and responsive to said determining, switching the main power supply from an off state to an on state or from an on state to an off state.

Aptly, the method further comprises: responsive to receiving said command, de-activating at least one heater of the first computing device.

Aptly, the user interface device is one or more of a cash dispenser, an encrypted PIN pad, a statement printer, a receipt printer, a card reader, a barcode reader, an ID scanner, or a Point of Sale Terminal.

Aptly, each of the plurality of computing devices is one of an Automated Teller Machine, ATM, a Self-Service Terminal, SST, a Point of Sale, POS, terminal or a kiosk.

According to a second aspect of the present invention there is provided a computing device comprising at least one processor configured to execute executable software, wherein the executable software, when executed, causes the processor to: receive, from a master computing device in communication with each of a plurality of computing devices, at least one command for changing a state of at least one user interface device of the computing device; and change a state of at least one said user interface device from a first state with a first power usage to a second state with a second power usage that is less than the first power usage, thereby reducing the power usage of the computing device.

According to a third aspect of the present invention there is provided a computing system comprising a master computing device and a plurality of slave computing devices in communication with the master computing device, wherein each respective slave computing device is configured to: receive, from the master computing device, at least one command for changing a state of at least one user interface device of the respective slave computing device; and change a state of at least one said user interface device from a first state with a first power usage to a second state with a second power usage that is less than the first power usage, thereby reducing the power usage of the respective slave computing device.

Aptly, each slave computing device is within a predetermined distance of each other slave computing device and is one of an Automated Teller Machine, ATM, a Self-Service Terminal, SST, a Point of Sale, POS, terminal or a kiosk.

According to a fourth aspect of the present invention there is provided a computer program comprising instructions which, when executed by a computing device, cause the computing device to carry out the steps of the method defined by the first aspect of the present invention.

Certain embodiments of the present invention help reduce power consumption of ATMs, SSTs, kiosks, POS terminals and the like and thus help reduce $CO_2$ usage.

Certain embodiments of the present invention help enable the taking out of service of particular ATMs in a network based on geographical and usage data, with information regarding ATMs still in service being displayed on the ATMs that are out of service.

Certain embodiments of the present invention utilise self-powered network interface devices to help allow a master computing device to have complete control over an ATMs power on/off state.

Certain embodiments of the present invention help enable power up and power down times of an ATM or the like to be controlled so that they automatically power on/off at pre-set times.

Certain embodiments of the present invention help provide inter-product capability/status determination and adaptive machine learning based load balancing into the ATM so there is an awareness of the other ATMs in their immediate vicinity. This awareness allows a master device to 'choose' when and which machines go to 'sleep' based on location, peak times and services required. When machines are asleep the display directs the consumer to the unit(s) that are still fully active. Having the ability to do this reduces power consumption across an estate, has a positive environmental impact and decreases any CIT/CE visits.

BRIEF DESCRIPTION OF THE DRAWINGS

Embodiments of the present invention will now be described hereinafter, by way of example only, with reference to the accompanying drawings in which.

In the drawings like reference numerals refer to like parts.

DETAILED DESCRIPTION

Figure 1:
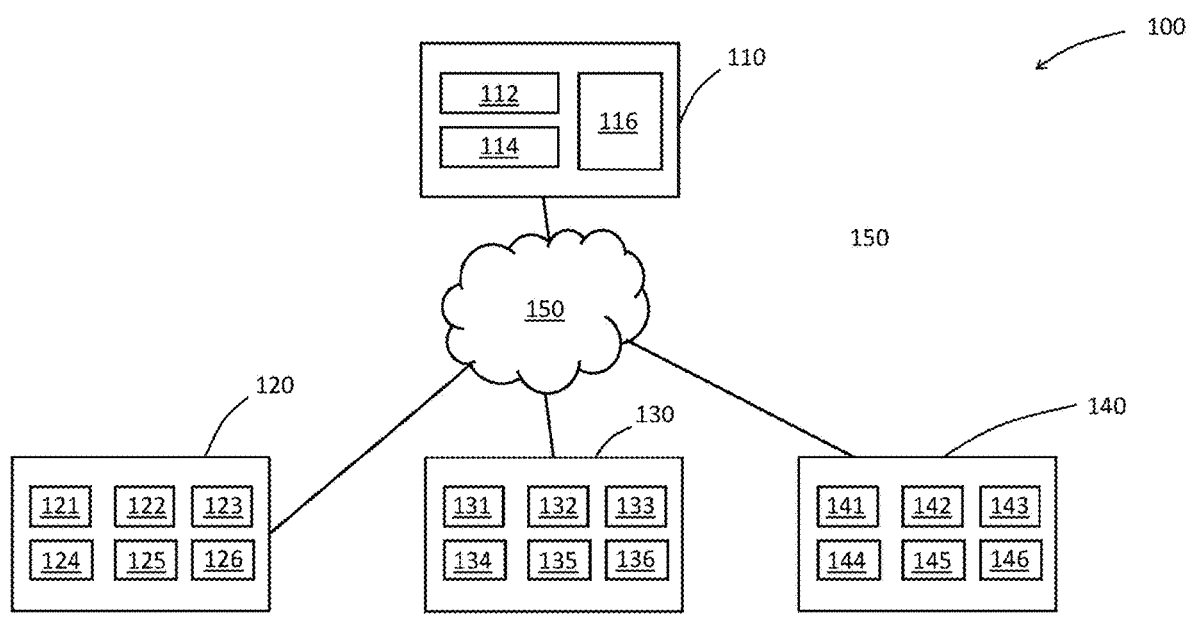
FIG. 1 illustrates a computing system.

FIG. 1 illustrates a computing system 100. The computing system includes a master computing device 110 and three slave computing devices 120, 130, 140 which can be controlled by the master computing device. Each of the slave computing devices are located remotely from each other. However, it will be appreciated that in some embodiments the one or more of the computing devices may be adjacent. In FIG. 1, each of the slave computing devices are Automated Teller Machines (ATMs). However, it will be appreciated that according to certain other embodiments of the present invention, the system may also include Point of Sale (POS) Terminals, Self-Service Terminals (SSTs), kiosks or the like instead of or in addition to ATMs. It will also be appreciated that whilst three slave ATMs are illustrated in FIG. 1, any number of ATMs (or POS terminals or SSTs or the like) could be included in the system. The master computing device may be a laptop, a desktop computer, a mobile phone, a tablet, another ATM, POS terminal, SST, kiosk or the like. The master computing device includes one or more processors 112, at least one memory 114, and a display 116. The memory is a non-transitory computer-readable storage medium. The memory 114 stores executable software that is executable by the processors 112 of the first ATM. When the executable software is executed by the processors, the processors may perform the methodology as described herein. The display 116 displays a graphical user interface. For example, the display may display a dashboard allowing a real time view of the transaction rate and the power output for each slave computing device. The master computing device may also include a communication interface (not shown) for communicating with the three slave computing devices 120, 130, 140.

The first ATM 120 includes one or more processors 121, at least one memory 122, a set of user interface devices 123, a set of power supplies modules 124 for supplying power to the user interface devices (with one power supply module being provided per user interface device), a main power supply 125 for supplying power to the entire first ATM (including providing power to each of the power supply modules 124), a display 126 and a heater (not shown). The memory is a non-transitory computer-readable storage medium. The memory 122 stores executable software that is executable by the processors 121 of the first ATM. When the executable software is executed by the processors, the processors may perform the methodology as described herein. The processors may include a main processor core that in a standby mode may be the only component that is provided with power as described hereinbelow. It will be appreciated that one user interface device or multiple user interface devices may be present on the first ATM. The user interface device may be any of a cash dispenser, an encrypted PIN pad, a statement printer, a receipt printer, a card reader, a barcode reader, an ID scanner, or a Point of Sale Terminal or the like. The power supply modules 124 are each configured to provide power to a specific user interface device. However, it will be appreciated that in certain embodiments a power supply module may be configured to supply power to multiple user interface devices simultaneously. The main power supply 125 supplies power to the entirety of the first ATM (including each of the power supply modules 124). The main power supply may include an integrated self-powered network interface device (not shown). This network interface device allows the master computing device to command how the ATM is powered. In other words, this allows the master computing device to dynamically command each ATM to power up/down. There may also be a self-powered timer integrated into the main power supply 125. The timer can cause the main power supply to power on or off after a pre-programmed time has elapsed. The timer can thus automatically cause the heater to power on/off in advance of the on/off times for the user interface devices. This may be achieved by powering the main power supply 125 on initially (when triggered by the timer) which causes power to be supplied to the heater, and then powering the power supply modules 124 on at a later time (when triggered by the timer). This may be useful to help prevent power wastage from the heater which consumes lots of power. The display 126 displays a graphical user interface for enabling the user to enter details and select options during transactions at the ATM. The heater ensures efficient operation of certain components within the ATM. The first ATM may also include a communication interface (not shown) for communicating with the master computing device 110.

The second ATM 130 includes one or more processors 131, at least one memory 132, a set of user interface devices 133, a set of power supplies modules 134 for supplying power to the user interface devices (with one power supply module being provided per user interface device), a main power supply 135 for supplying power to the entire second ATM (including providing power to each of the power supply modules 134), a display 136 and a heater (not shown). The memory is a non-transitory computer-readable storage medium. The memory 132 stores executable software that is executable by the processors 131 of the second ATM. When the executable software is executed by the processors, the processors may perform the methodology as described herein. The processors may include a main processor core that in a standby mode may be the only component that is provided with power as described hereinbelow. It will be appreciated that one user interface device or multiple user interface devices may be present on the second ATM. The user interface device may be any of a cash dispenser, an encrypted PIN pad, a statement printer, a receipt printer, a card reader, a barcode reader, an ID scanner, or a Point of Sale Terminal or the like. The power supply modules 134 are each configured to provide power to a specific user interface device. However, it will be appreciated that in certain embodiments a power supply module may be configured to supply power to multiple user interface devices simultaneously. The main power supply 135 supplies power to the entirety of the second ATM (including each of the power supply modules 134). The main power supply may include an integrated self-powered network interface device (not shown). This network interface device allows the master computing device to command how the ATM is powered. In other words, this allows the master computing device to dynamically command each ATM to power up/down. There may also be a self-powered timer integrated into the main power supply 135. The timer can cause the main power supply to power on or off after a pre-programmed time has elapsed. The timer can thus automatically cause the heater to power on/off in advance of the on/off times for the user interface devices. This may be achieved by powering the main power supply 135 on initially (when triggered by the timer) which causes power to be supplied to the heater, and then powering the power supply modules 134 on at a later time (when triggered by the timer). This may be useful to help prevent power wastage from the heater which consumes lots of power. The display 136 displays a graphical user interface for enabling the user to enter details and select options during transactions at the ATM. The heater ensures efficient operation of certain components within the ATM. The second ATM may also include a communication interface (not shown) for communicating with the master computing device 110.

The third ATM 140 includes one or more processors 141, at least one memory 142, a set of user interface devices 143, a set of power supplies modules 144 for supplying power to the user interface devices (with one power supply module being provided per user interface device), a main power supply 145 for supplying power to the entire third ATM (including providing power to each of the power supply modules 144), a display 146 and a heater (not shown). The memory is a non-transitory computer-readable storage medium. The memory 142 stores executable software that is executable by the processors 141 of the third ATM. When the executable software is executed by the processors, the processors may perform the methodology as described herein. The processors may include a main processor core that in a standby mode may be the only component that is provided with power as described hereinbelow. It will be appreciated that one user interface device or multiple user interface devices may be present on the third ATM. The user interface device may be any of a cash dispenser, an encrypted PIN pad, a statement printer, a receipt printer, a card reader, a barcode reader, an ID scanner, or a Point of Sale Terminal or the like. The power supply modules 144 are each configured to provide power to a specific user interface device. However, it will be appreciated that in certain embodiments a power supply module may be configured to supply power to multiple user interface devices simultaneously. The main power supply 145 supplies power to the entirety of the third ATM (including each of the power supply modules 144). The main power supply may include an integrated self-powered network interface device (not shown). This network interface device allows the master computing device to command how the ATM is powered. In other words, this allows the master computing device to dynamically command each ATM to power up/down. There may also be a self-powered timer integrated into the main power supply 145. The timer can cause the main power supply to power on or off after a pre-programmed time has elapsed. The timer can thus automatically cause the heater to power on/off in advance of the on/off times for the user interface devices. This may be achieved by powering the main power supply 145 on initially (when triggered by the timer) which causes power to be supplied to the heater, and then powering the power supply modules 144 on at a later time (when triggered by the timer). This may be useful to help prevent power wastage from the heater which consumes lots of power. The display 146 displays a graphical user interface for enabling the user to enter details and select options during transactions at the ATM. The heater ensures efficient operation of certain components within the ATM. The third ATM may also include a communication interface (not shown) for communicating with the master computing device 110.

The ATM functionality of each of the slave computing devices is configurable to suit the context and environments in which it is situated by including any combination of conventional ATM components in the ATM. Any of the three ATMs may for example include any combination of an encrypted PIN pad (not shown), a note dispenser (not shown), a receipt printer (not shown), a card slot (not shown) for insertion of a user's bank card, a contactless reader (not shown), a camera (not shown), a barcode reader (not shown), a cash recycler (not shown), a card printer (not shown), a touchscreen (not shown), a coin dispenser (now shown), a rolled coin dispenser (now shown), a microphone (not shown), speakers (not shown), mixed media deposit (now shown), biometric user authentication (now shown), cheque deposit module (not shown) or the like as will be appreciated by a person of skill in the art. When the ATM is an ITM, the ATM may further include additional functionality. For example, the ITM may include a signature pad, an ID scanner, a telephonic handset, a wired headset, a tactile keyboard, a beamforming microphone or the like as will be appreciated by a person of skill in the art. This hardware may not be present on a conventional non-ITM ATM. The ITM may also have functionality to enable an audio and video communication link to be established with a remote teller device. This functionality may not be present on a conventional non-ITM ATM.

The ATM 120, ATM 130, ATM 140 (slave computing devices) and master computing device 110 communicate via a network 150. The network 150 may be wired, wireless or a combination of wired and wireless. For example, the network is the internet. In some instances, the ATMs and computing device may communicate with each other via a secured private network.

Figure 2:
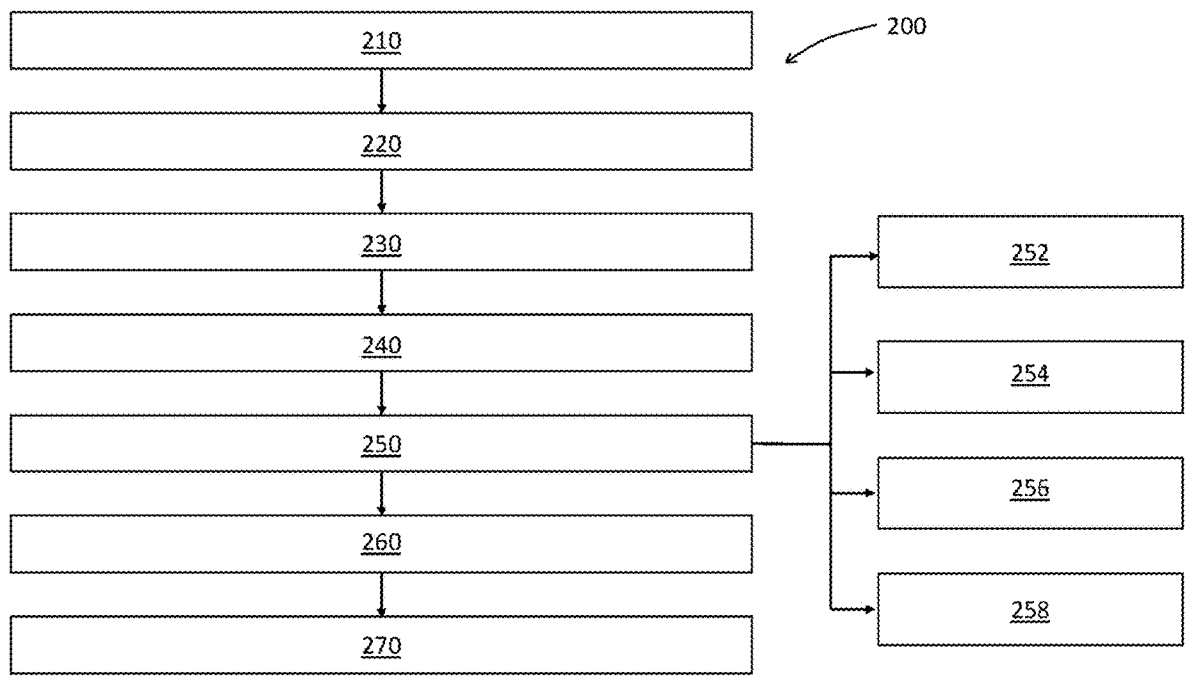
FIG. 2 illustrates a flowchart of certain steps for reducing power consumption by ATMs.

FIG. 2 illustrates a flowchart 200 of a methodology for reducing power usage of at least one slave ATM in communication with a master computing device. The master computing device and ATMs may be those as described in relation to FIG. 1. In use, any or each of the slave computing devices may send data to the master computing device indicative of the status and capability of the slave computing device in a first step 210. It will be appreciated that whilst this step is shown as a first step, the sending of this status and capability data can be performed at any time and may be performed continuously whilst the ATM is active or may be performed at repeated intervals whilst the ATM is active. The status may be that the slave ATM is in a normal state or in a standby state, or the status may be that the ATM is operational or that the ATM has one or more faults or is low/out of cash. The capability may be related to what user interface devices are installed on the slave ATM and the resulting capability of the ATM is what actions can be performed by these user interface devices. For example, one ATM may be capable of scanning ID cards and also dispensing cash whereas another ATM may only be capable of dispensing cash (but is not capable of scanning ID cards). Upon receipt of this data, the master computing device can determine in a second step 220 which user interface devices of which slave ATMs to change the state of (or it may be determined which ATMs as a whole to change the state of). Following this determination, commands may be sent to any of the slave ATMs which are to undergo a change of state in a third step 230. Software for performing these steps may run on each slave ATM, with ATMs on the same local network communicating to share their capabilities and status (with the master computing device). The best combination of individual modules, or complete ATMs, to put into sleep mode at different times throughout the day/week can then be determined. As discussed hereinbelow, this could for example be achieved by putting modules that support it into sleep/standby mode individually or by putting the entire ATM into sleep/standby mode.

As well as mapping of a whole ATM network, this approach can enable local load balancing to be achieved within a small group of ATMs that are co-located. This would for example allow in-lobby and through-the-wall units to be optimized independently. Alternatively, some ATMs could be grouped geographically where they could be controlled dependent on the status of adjacent units (i.e., planned maintenance or out-of-service conditions). The transaction load mapping and balancing may be broken down into module (user interface device) transactions (i.e., W overall transactions, X cash dispense, Y statement prints, Z cheque deposit, etc.), so that a master computing device can power down individual modules or ATMs across its group depending on the predicted module level demand.

Figure 3:
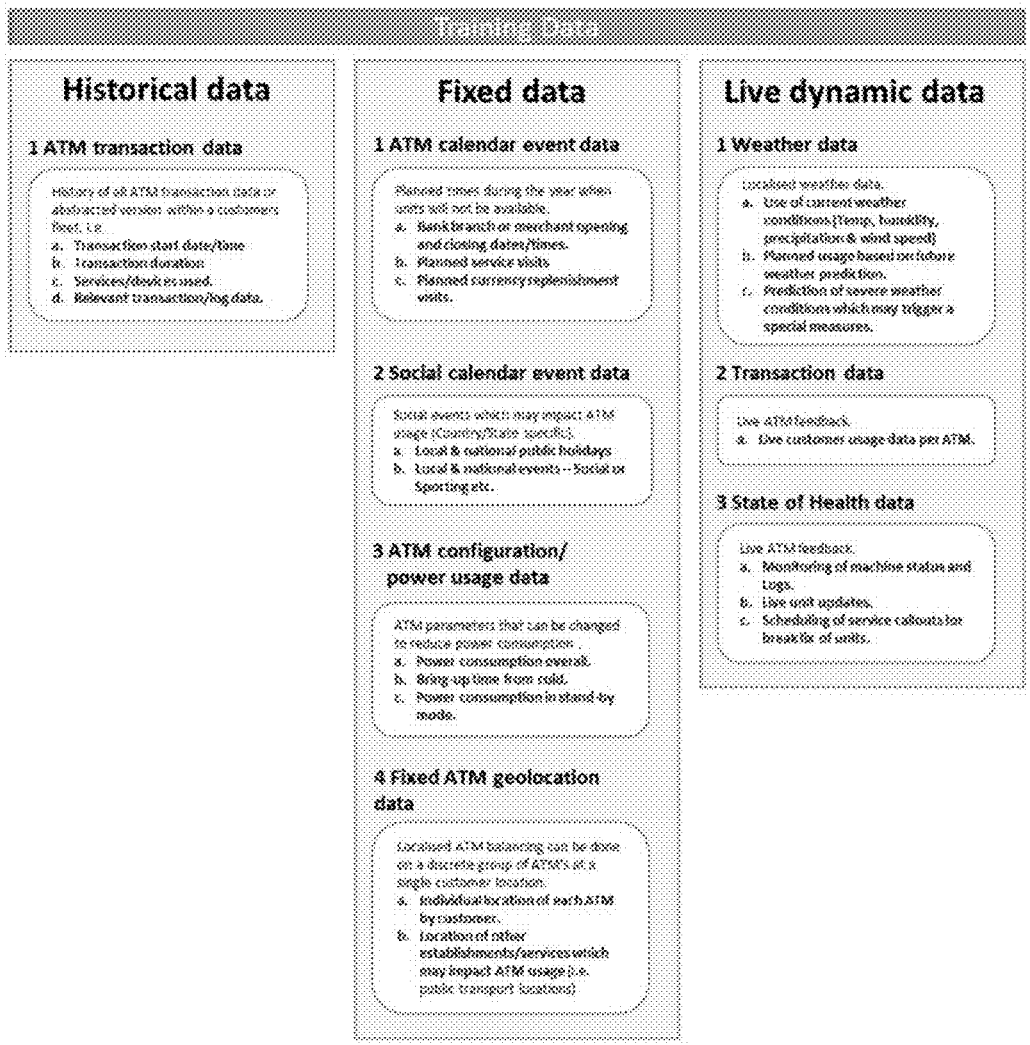
FIG. 3 illustrates training data for a machine learning module.

This local load balancing (deciding which modules or entire ATMs to change the state of) may be based on a variety of data. For example, this can be based on the specific geographical location of each ATM (relative to other ATMs), the day of the week, the time of day, the capability of the each of the ATMs (relative to other ATMs), or any combination thereof. As an example, a machine learning module may be pretrained to determine how to decide which slave ATMs or which user interface devices of the slave ATMs to change the state of. Training the machine module may involve inputting data into an untrained machine learning module indicative of certain types of data. For example, the data may be data indicative of the usage of the ATM over a preset time period (e.g., how the ATM has been used historically) or events that may affect usage of the ATM (e.g., days when a shopping centre is closed, weather events, national holidays etc.) or the like. FIG. 3 illustrates the various types of data 300 that could be input into a machine learning module to train it to perform the determination described herein. After training, data associated with each of the ATMs may then be input into the pretrained machine learning module. For example, this may be ATM status data, capability data, real time weather data, service appointment data or the like. This may cause the pretrained machine learning module to output data indicating which user interface device or which ATM to change the state of. At the outset, there may not be enough to data to sufficiently train a machine learning module. Thus, before enough data is collected to train the machine learning module, a moving average type algorithm that updates the mapping based on limited inputs may be implemented. Once enough data is collected and the ML module is trained, this moving average approach could then be replaced and dynamically enhanced by machine learning using more granular data and usage patterns to optimize power consumption during continued usage. A dynamic regression model may be suitable for this using training data 300 as illustrated in FIG. 3. A time series (temporal) prediction-based machine learning model may for example be utilized. This enables the master computing device to track usage rates for each slave ATM and each user interface device on those ATMs over time and use machine learning to continuously improve the determination of the sleep mode or power down timing.

Following the master computing device sending the command in the third step 230 to any one of the ATMs for changing the state of one or more of the user interface devices present on the ATM to which the command is sent, in a fourth step 240 the given ATM processes the command via its processors. This results in the state of the relevant user interface device (or devices) specified in the command being changed in a fifth step 250. Particularly, in the fifth step 250 the state is changed from a first state which uses a particular amount of power to a second state which uses a lower amount of power than the first state. This results in power consumption by the ATM being reduced. This is achieved by de-activating the user interface device referred to in the command. This means that the user interface device is no longer active (i.e., it is out of service or can no longer be used). The change in state may be achieved in a number of ways as will now be described.

In one example, at step 252, any or each ATM (i.e., the entire ATM) may be switched into a standby mode/state (from a normal mode/state) where everything is powered off except the main processor core. This may be achieved by using a main power supply that has a 24v standby mode, with the 24v power supply being supplied to the main processor core only upon entering the standby mode. This means that all power to the power supply modules on the specific ATM and thus power to all user interface devices is removed (thus they would all be de-activated). Alternatively, a small Internet of Things enabled network interface device may be integrated into the ATM Power Supply Unit to allow the master computing device to command overall ATM power. The network interface device may be self-powered to ensure it can still communicate with the master computing device. That is to say that the master computing device may send a command, at step 254, to the network interface device which results in the main power supply being switched off altogether. This would allow the master computing device to dynamically command each ATM to power up/down. Powering down the ATM would also remove all power from all power supply modules and thus all user interface devices, meaning the devices would all be de-activated.

As an alternative to full ATM power down or switching the ATM into a standby state, the master computing device may also send a command, in a step 256, to control the power down of individual user interface devices. For example, an individual Power Supply Unit may be provided for each user interface as described above and then any of these Power Supply Units may be switched off to thereby remove power from the user interface devices that they are configured to power. Selected user interface devices could thus be de-activated. This allows each user interface device to be switched off and on independently. Alternatively, instead of switching power from the power supply modules off, the power supply module may be switched from a normal state to a standby state in a step 258 upon receipt of the command. The standby state consumes less power than the normal state. This may be achieved by using power supply modules supporting 24v capability.

In addition to changing the state of a user interface device, as heaters can be a major power consumer on ATMs, these could also be powered down at an appropriate time. For example, to account for the slow cooling and heating rate of a large ATM, power on/off times may be automatically implemented for the heaters suitably in advance of the planned on/off times for the ATM modules (user interface devices).

When the state of any of the ATMs is changed (i.e., by de-activating one or more of the user interface devices), the display of that ATM may be configured to display a message in a sixth step 260. The message may provide information indicative of a location of other ATMs in the near vicinity of the ATM that has changed state and that are still fully operational. For example, if the ATM is within a shopping centre, the ATM may display the locations of other ATMs in the shopping centre that can still be used by the user.

The ATM may be configured to display this message until the master computing device sends a command to the ATM in a seventh step 270, causing the ATM to return to its normal state. The ATM then returns to normal operation.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

What is claimed is:

1. A computer-implemented method for reducing power usage of at least one computing device, comprising the steps of:
   sending, from each of a plurality of computing devices, data indicative of a status and capability of each respective computing device, to a master computing device;
   determining, by the master computing device, at least one selected user interface device of at least one selected computing device to change a state of;
   determining the selected user interface device to change a state of based on a geographical location of each computing device of the plurality of computing devices relative to a geographical location of other computing devices of the plurality of computing devices and/or based on a day of the week and/or based on a time of day and/or based on a capability of each computing device of the plurality of computing devices relative to a capability of other computing devices of the plurality of computing devices, wherein said determining comprises:
      inputting the data indicative of the status and capability of each respective computing device into at least one machine learning module;
      outputting, from the machine learning module, data indicating at least one selected user interface device of at least one selected computing device to change a state of; and
      applying a moving average to the data output from the machine learning model;
   receiving, by at least one first computing device of a plurality of computing devices, and from the master computing device in communication with each of the plurality of computing devices, at least one command for changing a state of the at least selected one user interface device of the selected computing device based on the output from the machine learning module; and
   responsive to receiving the command, changing a state of the at least one said user interface device from a first state with a first power usage to a second state with a second power usage that is less than the first power usage, thereby reducing the power usage of the first computing device.

2. The method as claimed in claim 1, wherein:
changing a state of the user interface device comprises de-activating the user interface device.

3. The method as claimed in claim 2, wherein:
de-activating the user interface device comprises switching off a respective power supply that supplies power to a respective user interface device.

4. The method as claimed in claim 2, wherein:
de-activating the user interface device comprises switching the user interface device from a normal state into a standby state, whereby the standby state uses less power than the normal state.

5. The method as claimed in claim 2, wherein:
de-activating the user interface device comprises switching off a main power supply of the first computing device, thereby de-activating all user interface devices of the first computing device.

6. The method as claimed in claim 5, further comprising:
receiving, at a self-powered network interface device integrated into the main power supply of the first computing device, said command.

7. The method as claimed in claim 2, wherein:
de-activating the user interface device further comprises switching the first computing device from a normal state into a standby state, whereby the standby state uses less power than the normal state, thereby de-activating all user interface devices of the first computing device.

8. The method as claimed in claim 7, further comprising:
switching the first computing device into a standby state comprises only providing power to at least one main processor core of the first computing device.

9. The method as claimed in claim 1, further comprising:
responsive to changing the state of the user interface device, displaying a message on a display of the first computing device indicating a location of at least one other computing device of the plurality of computing devices that remain in a normal state.

10. The method as claimed in claim 1, further comprising:
determining, via a timer device integrated into a main power supply of the first computing device, that a predetermined time has elapsed; and
responsive to said determining, switching the main power supply from an off state to an on state or from an on state to an off state.

11. The method as claimed in claim 1, further comprising:
responsive to receiving said command, de-activating at least one heater of the first computing device.

12. The method as claimed in claim 1, whereby:
the user interface device is one or more of a cash dispenser, an encrypted PIN pad, a statement printer, a receipt printer, a card reader, a barcode reader, an ID scanner, or a Point of Sale Terminal.

13. The method as claimed in claim 1, whereby:
each of the plurality of computing devices is one of an Automated Teller Machine, ATM, a Self-Service Terminal, SST, a Point of Sale, POS, terminal or a kiosk.

* * * * *